May 12, 1970

J. L. FISHER ET AL 3,512,176

LIGHT BEAM OSCILLOGRAPH

Filed Dec. 18, 1967

INVENTORS
JAMES L. FISHER
FRED T. KLEIN
JOHN D. SCHROEDER
CALVIN O. VOGT

Richards, Harris & Hubbard
ATTORNEY

May 12, 1970     J. L. FISHER ET AL     3,512,176
LIGHT BEAM OSCILLOGRAPH Filed Dec. 18, 1967     4 Sheets-Sheet 3

SLOPE OF A = $K_2/K_1$

United States Patent Office 3,512,176
Patented May 12, 1970

3,512,176
LIGHT BEAM OSCILLOGRAPH
James L. Fisher, Fred T. Klein, John D. Schroeder, and Calvin O. Vogt, Tulsa, Okla., assignors to Century Geophysical Corporation, Tulsa, Okla., a corporation of Delaware
Filed Dec. 18, 1967, Ser. No. 691,486
Int. Cl. G01d 15/14
U.S. Cl. 346—109                                    13 Claims

ABSTRACT OF THE DISCLOSURE

A strip chart oscillograph including one or more vertically mounted pivotable galvanometers mounted toward the rear portion of the oscillograph housing to deflect a light beam through an optic system in accordance with an input signal desired to be recorded on a light sensitive paper. A servomotor tachometer drives a paper transport system at any one of a number of preselected speeds to dispense the light sensitive paper as the deflection of the light beam is recorded thereon. Operating in synchronism with the speed of the paper transport is a timing system to record on the light sensitive paper time interval marks. Each galvanometer of the oscillograph is individually adjustable by means of a linkage extending through the front panel of the oscillograph housing to position the light beam deflections onto a given area of the light sensitive paper.

BACKGROUND OF THE INVENTION

This invention relates to a recording apparatus and more particularly to a light beam strip chart oscillograph wherein variations in an input signal are recorded on light sensitive paper.

General purpose oscillographs are used extensively in medical diagnostic evaluation and research, industrial in-process monitoring, electrical and electronic laboratory research and testing, and environmental monitoring. The test data gathered from these areas and connected to the oscillograph is imprinted on a permanent record in one of many different modes, such as pen and ink, or electrostatic charge recording. The pen and ink method of recording data is widely used; however, such systems have continuously been plagued at one extreme with blocking of the inking system and at the other extreme with flooding of the inking system. In accordance with the present invention, the test data connected to the oscillograph is converted into light beam deflections which are recorded on light sensitive paper.

In addition to eliminating the somewhat unreliable inking system, a light beam oscillograph has the advantage of being able to record light beams that cross while pens are limited to narrow, separate channels. Further, a light beam oscillograph is capable of recording higher frequency signals. The physical mass associated with pen and ink recording results in a system that has a very poor frequency response curve thus limiting the type of data that can be recorded. Another shortcoming of the pen and ink oscillograph is that the data is recorded on an arc that is caused by the short radius through which the pen moves. A few pen and ink type recorders have attempted to eliminate this curvature problem by means of complicated four bar linkages. Unfortunately, the four bar linkage adds considerable weight to the pen system thereby necessitating a high power positioning device which in itself has a poor frequency response characteristic. The light beam oscillograph of the present invention includes a light beam galvanometer positioned some distance from the recording medium to provide recorded data in linear form. Positioning the galvanometer a considerable distance from the recording medium also increases the sensitivity to small input signals. The lightweight construction of a light beam galvanometer thus permits recording of high frequency signals.

In accordance with the present invention, there is also provided a means for adjusting the position of the deflected light beam on the recording medium. The galvanometers are individually mounted to pivot about a vertical axis and connect to an arm extending through the front panel of the oscillograph housing. A simple sideway back and forth motion of the arm extending through the housing front rotates the galvanometer about its vertical axis thus positioning the light beam reflected therefrom onto a particular area of the light sensitive recording paper. The galvanometer can be adjusted while recording and the new position observed through a window in the front panel of the housing.

It has long been realized that the accuracy of data recorded by a strip chart oscillograph is dependent upon the accuracy with which the speed of delivery of the recording paper can be controlled. Many recording oscillographs use a synchronous motor in conjunction with a gear train transmission. The accuracy of the speed of the paper travel is determined by the quality of the gears in the gear train. Any backlash and wear in the gears will adversely affect the speed of the paper travel. To vary the speed of paper travel with a gear train drive, it is necessary to shut down the recorder and change gears in the transmission. A feature of the oscillograph of the present invention is that the paper speed is accurately controlled by means of a servomotor tachometer system. The speed is push button selected and can be varied at any time even while recording.

In accordance with the present invention, there is further provided an oscillograph wherein timing marks are recorded on the recording medium at preset intervals or at intervals automatically determined by the speed of the paper travel. Light from a high intensity flash lamp is directed through an optical system to the light sensitive recording paper. This system does not interfere in any way with the recording system and does not add any frequency response limitation to the overall system.

SUMMARY OF THE INVENTION

A strip chart recorder including a housing having a front panel with an opening therein and a light beam galvanometer responsive to an input signal mounted toward the rear portion of said housing opposite the front panel, a light source generates a beam of light to be deflected by the galvanometer in response to the input signal. The deflected light beam is transmitted through a light transmitting system to be recorded on light sensitive recording means positioned at the front panel of said housing and dispensed through the opening therein. A mechanical adjustment extending through the front panel provides a simple means of adjusting the position of the deflected light beam as it is recorded.

A more complete understanding of the invention and its advantages will be apparent from the following specification and claims and from the accompanying drawings illustrative of the invention.

BRIEF DESCRIPTION OF THE DRAWINGS

Referring to the drawings.

DESCRIPTION OF THE PREFERRED EMBODIMENT

Figures 1, 4:
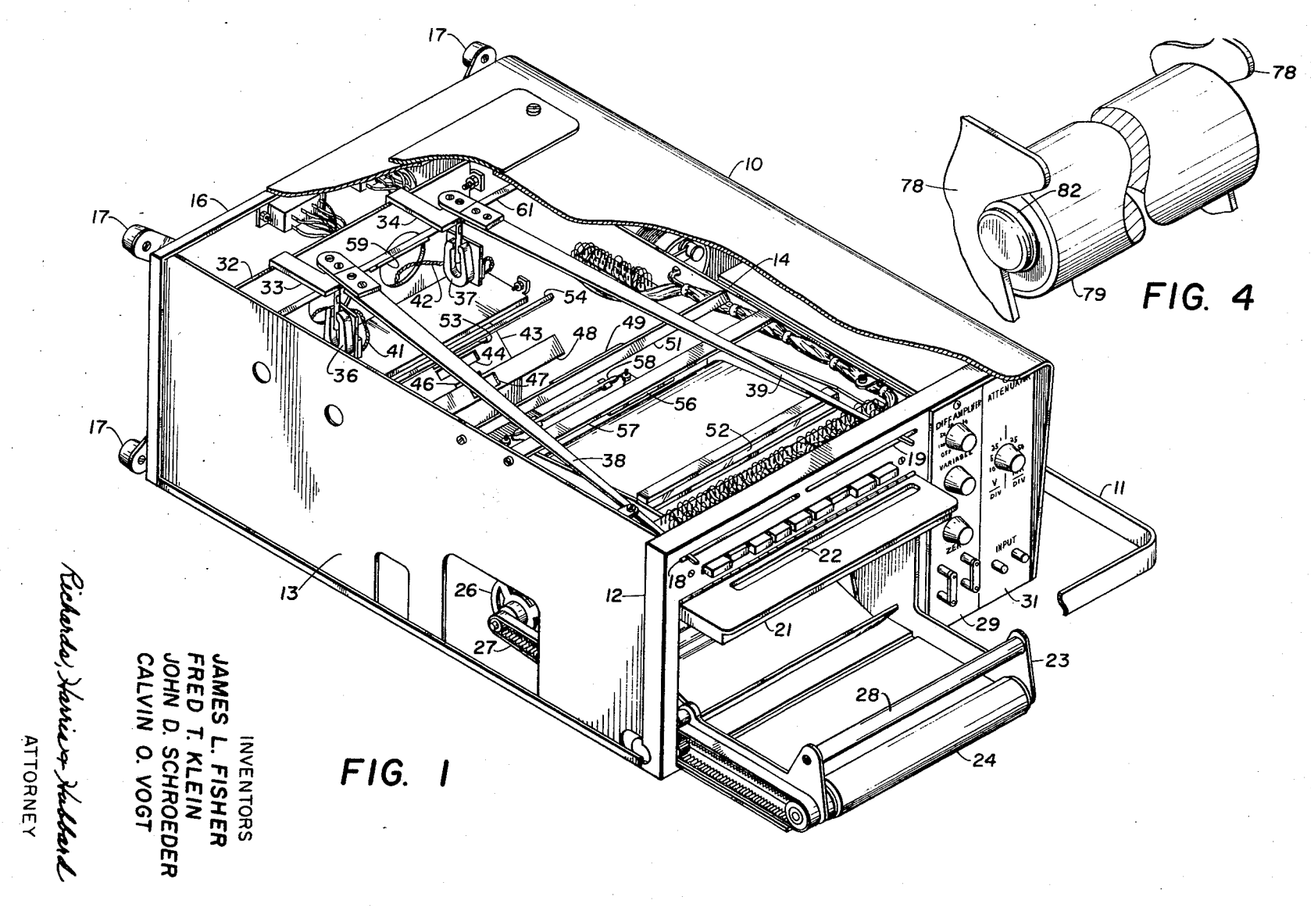
FIG. 1 is an oblique view partially cut away of a light beam oscillograph in accordance with the present invention.
FIG. 4 is an isometric view of the roller for use in the paper system shown in FIG. 3.

Referring to FIG. 1, there is shown a two-channel light beam oscillograph including a cover 10, partially cut away, having a handle 11 attached thereto. The cover 10 encloses a housing having a front panel 12, side panels 13 and 14, and a rear panel 16. Attached to the rear panel 16 are four rubber tipped legs 17, only three being shown, having a U-shaped configuration which provides convenient storage for a power cord (not shown) and any input signal cables (also not shown). The front panel 12 includes two narrow horizontal openings 18 and 19 and an array of nine control push button switches. Seven of the nine push buttons are for speed selection of the paper transport to be described shortly. Four of these seven speed selection push buttons provide basic speeds and the other three are multipliers of the four basic speeds. One of the nine push buttons controls power to the oscillograph and the other actuates the recording system. Below the control push buttons, the front panel 12 includes an opening having a viewing panel 21 hinged to swing from a vertical position to the horizontal position as shown. The viewing panel 21 includes a window 22 for observing the operation of the light beam recording. A transport door 23 is also hinged to the front panel 12 to move from a vertical position to the horizontal position as shown. The transport door 23 includes a rubber covered metering roller 24 rotated by means of a servomotor tachometer 26 through a nonslip flexible gear belt 27. The transport door 23 also includes a tension bar 28 the purpose of which will be explained shortly. To the right of the transport door 23 there is shown two signal manipulating modules 29 and 31 which are used to standardize the input signals to the oscillograph. The modules 29 and 31 are plug-in type and can be easily removed and substituted with other modules depending upon the type of data to be recorded.

Internally, the housing includes a horizontal bracket 32 bolted to the side panels 13 and 14. Attached to the horizontal bracket 32 is a left galvanometer support 33 and a right galvanometer support 34. A light beam galvanometer 36 is rotatably coupled to the bracket 33 to pivot about a vertical axis, and a light beam galvanometer 37 is rotatably mounted to the bracket 34 to also pivot about a vertical axis. The light beam galvanometers 36 and 37 are rotated about their vertical axis by means of respective adjusting arms 38 and 39 extending through either the horizontal slot 18 or 19. The galvanometer 36 is electrically connected to the output of the module 29 by means of a cable 41, and the galvanometer 37 is electrically connected to the output of the module 31 by means of a cable 42.

Located below the horizontal bracket 32 is a lamp chamber 43 having apertures 44 and 46. The lamp chamber 43 contains a xenon arc lamp (not shown) for supplying a high intensity point source of light to the galvanometers 36 and 37. Light from the xenon lamp passes through the aperture 46 and is focused by means of a condensing lens 47 mounted to a bracket 48 onto a mirror 49 mounted to a bracket 51. The mirror 49 reflects the focused light to the galvanometers 36 and 37. A light beam incident on the reflective element of the galvanometer is reflected therefrom and transmitted through a condensing lens 52 and focused on a mirror (not shown) positioned above the recording paper. Light from the aperture 44 is transmitted to a mirror 53 mounted on a bracket 54 and reflected to a mirror 56 mounted on a bracket 57. The light beam reflected to the mirror 56 is further reflected to a grid mask (not shown) positioned adjacent to the recording paper through the condensing lens 52.

Light for timing pulses is provided for by means of a xenon lamp 58 connected to a pulse generating circuit, to be described. High intensity light from the lamp 58 is reflected from a mirror 59 mounted on a bracket 61 through the condensing lens 52 and focused on a mirror (not shown) positioned above the recording paper.

Figure 2:
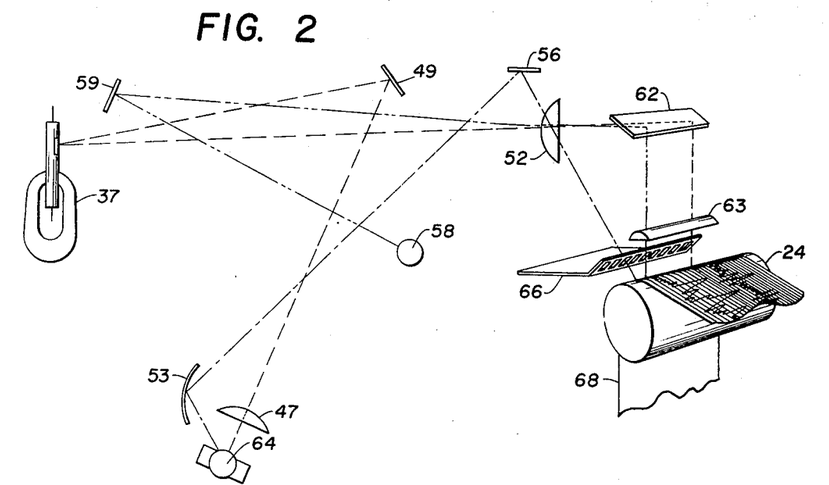
FIG. 2 is a schematic of the optical system of the oscillograph of FIG. 1.

Referring to FIG. 2, there is schematically shown the optical system for the oscillograph of FIG. 1. Light from the timing lamp 58 is reflected from the mirror 59 through the condensing lens 52 to a mirror 62 and through a condensing lens 63 to the light sensitive paper 68 as it passes over the metering roller 24. The lamp 58 is periodically energized to generate one pulse during a fixed interval of time, the time interval depending upon the selected mode of operation. The galvanometer optic system includes a xenon lamp 64 emitting high intensity light that is focused by the condensing lens 47 on the mirror 49 and reflected therefrom to the galvanometer 36 or 37. Light from the signal responsive galvanometer reflecting element is focused by the condensing lens 52 on the mirror 62 and reflected therefrom through the condensing lens 63 onto the light sensitive paper as it passes over the metering roller 24. Light from the xenon lamp 64 is also reflected from the mirror 53 to the mirror 56 through the lens 52 and then through the grid mask 66 thereby causing grid lines to be pritned on the light sensitive recording paper as it is dispensed over the metering roller 24.

In operation, an input signal connected to the module 31 is standardized to meet the operating specifications of the galvanometer 37. The standardized signal from the module 31 is connected through a sensitivity adjusting circuit (to be described) mounted on the bracket 33 to the signal responsive element of the galvanometer 37. A signal to the active element of the galvanometer 37 causes the mirrored surface thereof to rotate in the magnetic field of a permanent magnet thereby causing the image of the point source reflected from the mirror 49 to be swept across the mirror 62 and onto the light sensitive paper 68. The magnitude of the trace deflection on the recording paper is proportional to the magnitude of the input signal connected to the module 31. The frequency and shape of the recording is also related to the input signal. To adjust the light beam to sweep over a given portion of the light sensitive paper requires the simple movement of the adjusting arm 39 as it extends through the horizontal slot 19. As the arm 39 is moved in the slot 19, it rotates the entire assembly of the galvanometer 37. It should be apparent that what has been described with reference to the galvanometer 37 and the module 31 also applies to the galvanometer 36 and the module 29.

Figure 3:
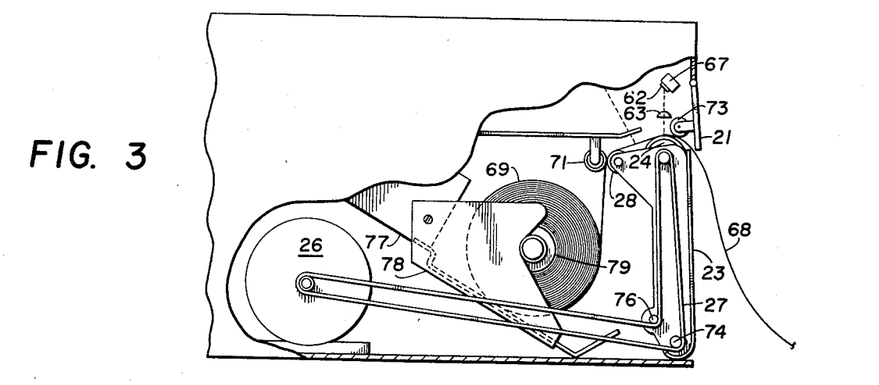
FIG. 3 is a detailed side view of a transport system for feeding from a paper roll.

Referring to FIG. 3, there is shown a paper transport system for rolled paper including the mirror 62 mounted to a bracket 67 and the condensing lens 63 for focusing light on the light sensitive paper 68 as it passes over the metering roller 24. The light sensitive paper 68 unwinds from a roll 69 and passes between the tension bar 28 and a tension roller 71 to apply a preset resistance to the paper as it passes over the metering roller 24 regardless of the size of the roll 69. The paper 68 then passes between the metering roller 24 and a pressure roller 73; the pressure roller maintains a constant pressure on the metering roller to insure accurate delivery of the paper 68 at all paper speeds. As explained previously, the metering roller 24 is driven by the servomotor tachometer 26 by means of a flexible gear belt 27 which engages an idler gear 74 and an idler pulley 76. The paper roll 69 is stored in a hopper 77 having side plates 78 (only one shown) with a V-shaped configuration. A core roller 79 is inserted through the center of the roll 69 and engages the V of the sides 78 during acceleration of the paper 68 to insure the proper positioning of the roll as the paper is unwound.

Referring to FIG. 4, there is shown in detail the roller 79 in engagement with the notch of the sides 78. The core 79 includes a grooved shaft on either end with an O-ring 82 assembled therein. Whenever the delivery speed of the paper 68 is increasing, the O-rings 82 (only one shown) ride in the notch of the sides 78. The O-rings 82 then act as cushions and prevent chattering of the roll and a nonuniform paper speed over the metering roller 24.

Figure 5:
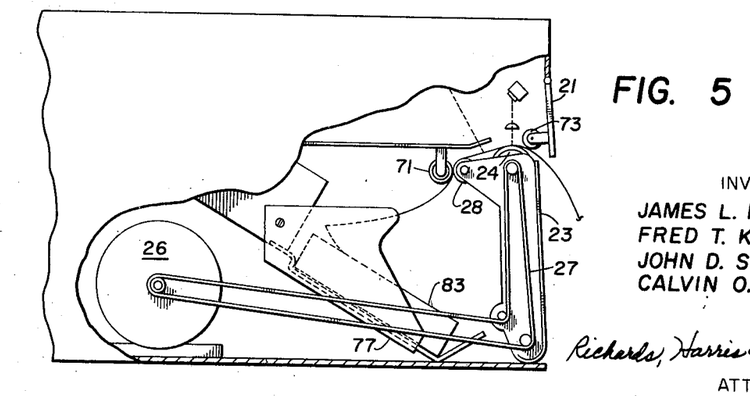
FIG. 5 is a detailed side view of a transport system for feeding paper stored in a folded configuration.

Referring to FIG. 5, there is shown the identical paper transport system as shown in FIG. 3 with the roll 69 replaced by a pack 83 of light sensitive fan fold paper. The fan fold paper is dispensed from the pack 83 as it passes between the tension bar 28 and the tension roller 71 and between the metering roller 24 and the pressure roller 73. The metering roller 24 is driven at the same speeds with the fan fold paper as with the roll paper by means of the servomotor tachometer 26 through the flexible gear belt 27. In FIGS. 3 and 5, the viewing panel 21 and the transport door 23 are shown in their vertical position as required to dispense the light sensitive paper during the recording operation.

Figures 6, 9:
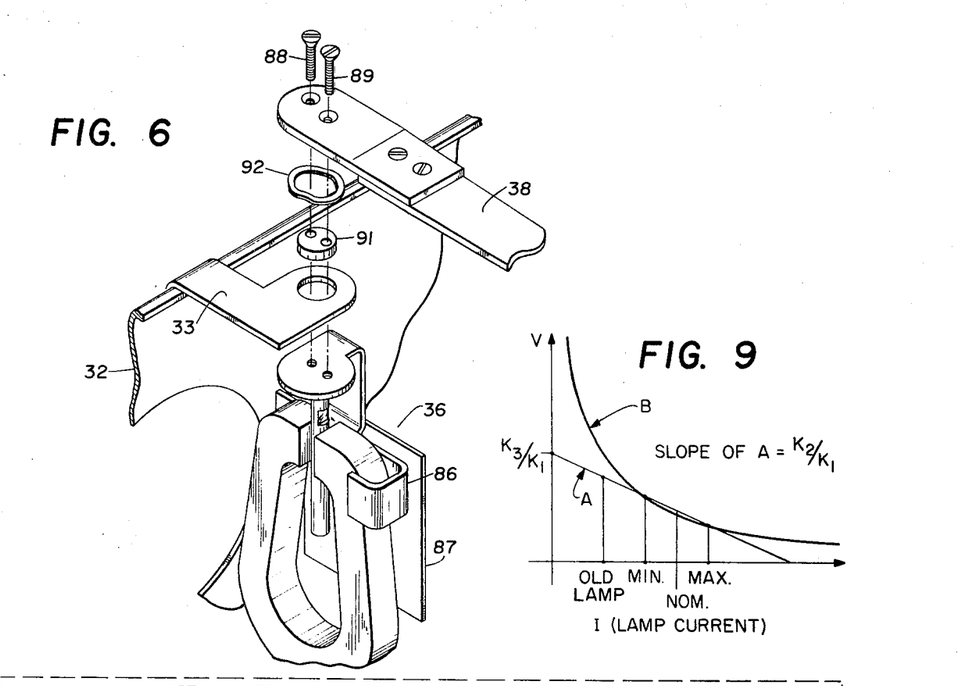
FIG. 6 is an exploded view of the mechanical adjusting system for the light beam galvanometer.
FIG. 9 is a plot of the output voltage of a regulator circuit versus output current for the light source of the oscillograph of FIG. 1.

Referring to FIG. 6, there is shown an exploded view of the mechanical adjustment for the galvanometer 36. The permanent magnet of the galvanometer 36 is bolted to an adjusting frame 86 that also supports a galvanometer trimmer circuit board 87. The adjusting frame 86 is assembled in sliding contact with the bracket 33 and bolted to the adjusting arm 38 by means of machine screws 88 and 89. A pivot disk 91 positions the adjusting frame 86 with respect to the bracket 33. A spring washer 92 assembled between the arm 38 and the upper surface of the bracket 33 provides a fixed amount of tension to hold the galvanometer 36 in any desired position.

Figure 7:
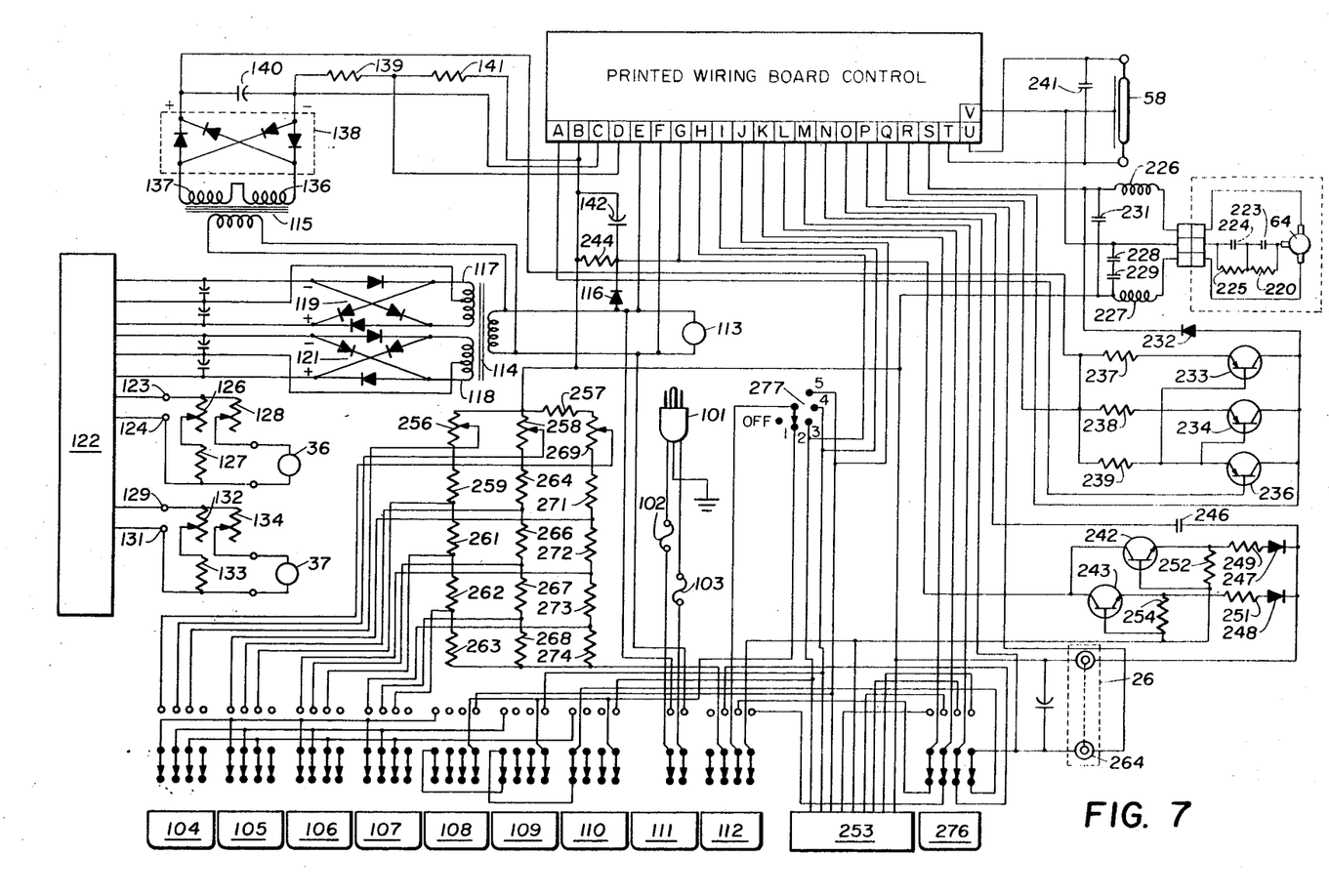
FIGS. 7 and 8 are electrical schematics of the control system for the paper transport and the timing light.

Referring to FIG. 7, there is schematically shown the control circuit for the oscillograph of FIG. 1 but excluding the circuitry of the modules 29 and 31. Power is supplied to the circuit through a power cord 101 and fuses 102, 103 to the power on push button switch. The nine push button switches shown at the front panel 12 are identified by numbers 104–112. Push button switches 104–110 are four-pole two position switches having a press-to-activate mechanism. The push buttons 104 through 107 are a mutually releasing group and the push buttons 108 through 110 are a mutually releasing group; the two groups are independent of each other. Push button switch 111 is a two-pole double throw switch with a self release action. Similarly, push button switch 112 also has a self release mechanism. In FIG. 7 the switches are all shown in the release position. Electrical energy supplied by the power cord 101 is connected to the push button switch 111. Activating the push button 111 connects power to a cooling fan motor 113 which is located on the rear panel 16. Power from the switch 111 also energizes a module supply transformer 114, a lamp supply transformer 115, and is rectified by a diode 116. The supply voltage is also connected to terminals E and F of the control amplifier shown schematically in FIG. 8. The module supply transformer 114 includes secondary windings 117 and 118 having A.C. voltages that are rectified to a direct current voltage by means of full wave diode rectifiers 119 and 121, respectively. The direct current output of the rectifier 119 supplies operating voltage to the module 29 and the direct current output of the rectifier 121 supplies operating voltage to the module 31. Since the modules 29 and 31 vary with the input data to be recorded, the outputs of the rectifiers 119 and 121 are shown terminated at a pair of connectors, represented by a block 122, into which the modules would be plugged. The output signal from the module 29 which is a standardized signal of the data to be recorded connects to terminals 123 and 124 of a galvanometer trimming circuit that includes a potentiometer 126 in series with a resistor 127, and a potentiometer 128 having a wiper arm connected to one terminal of the active element of the galvanometer 36. The potentiometer circuits provide a calibration means for the galvanometers such that any one of a number of modules can be inserted in positions 29 and 31 without the requirement of individual galvanometer adjustments. The output of the module 31 is connected to terminals 129 and 131 of a calibration circuit for the galvanometer 37 which includes a potentiometer 132 in series with a resistor 133 and a potentiometer 134 having a wiper arm connected to the active element of the galvanometer 37.

The lamp supply transformer 115 includes serially connected secondary windings 136 and 137 coupled to a full wave diode rectifier 138 generating a direct current voltage proportional to the A.C. voltage across the secondary windings. Connected to the positive terminal of the full wave rectifier 138 is a lamp regulating circuit (to be described) and terminal Q of the control amplifier circuit. The negative terminal of the rectifier 138 is in series with resistors 139 and 141 and is connected to terminal C of the control amplifier. A filter capacitor 140 connects to the positive and negative terminals of the full wave rectifier 138. Resistors 139, a voltage dropping resistor, and resistor 141, a current sensing resistor, have a common terminal connected to terminal D of the amplifier control circuit. Resistor 141 interconnects with terminal B of the amplifier control circuit, a paper speed control circuit (to be described), a filter capacitor 142, and a resistor 244.

Figure 8:
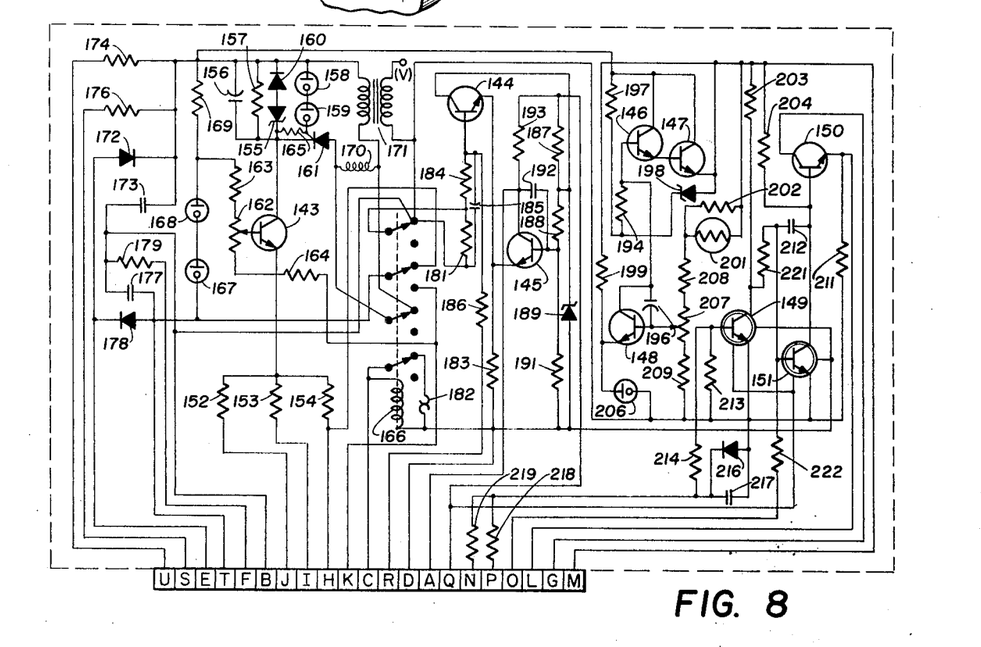

Referring to FIG. 8, there is shown the amplifier control circuit including transistors 143–151. Transistor 143 has an emitter electrode tied to a parallel arrangement of resistors 152, 153, and 154 which in turn are connected to terminals J, I, and H, respectively. The collector electrode of transistor 153 forms a junction with a capacitor 156, a resistor 157, a Zener diode 155 in series with a diode 160, a resistor 165, and the cathode electrode of a silicon controlled rectifier 161. The resistor 165 is tied to the gate electrode of the rectifier 161 and to a series arrangement of neon lamps 158 and 159. The base electrode of the transistor 143 connects to the wiper arm of a potentiometer 162 in series with resistors 163 and 164. Resistor 164 is connected to one of the four normally open contacts of a relay 166. A series arrangement of neon lamps 167 and 168 connects to the resistor 163 and to a resistor 169. Resistor 169 in turn is tied to the junction of the capacitor 156, the resistor 157, the diode 160, the neon lamp 158, a transformer 171, a diode 172, a capacitor 173, and resistors 174 and 176. The transformer 171 is in series with an inductance coil 170 connected to the rectifier 161. When the relay 166 is in the position shown, the coil 170 is shorted through a normally closed contact. Terminal U connects to a resistor 174, terminal S to a resistor 176, and terminal E to diodes 172 and 178. Terminal T is connected to a capacitor 177, a diode 178, the neon lamp 167, and to one terminal of the relay 166. The diodes 172 and 178, with the capacitors 173 and 177, comprise a rectifying and doubling circuit for the supply voltage. Terminal F connects to a resistor 179. Terminal B is a common connection to various components of the circuit of FIG. 8. Terminal K is connected to a normally open contact of the relay 166 and the resistor 164. The coil of relay 166 forms a junction with terminal C and is shunted by a circuit breaker 182 connected to a normally closed contact of the relay.

Transistor 144 has an emitter electrode forming a common junction with the emitter electrode of transistor 145 and a resistor 183. The base electrode of transistor 144 is coupled to a resistor 184, which is connected to the relay 166 and the resistor 181, and to resistor 186 which is connected to terminal R. A capacitor 185 shunts the resistors 181 and 184. The collector electrode of transistor 144 connects to the junction of resistors 187 and 188 and to a Zener diode 189. Resistor 188 is in series with a resistor 191 and connects to the base electrode of transistor 145, and to a capacitor 192. Transistor 145 has a collector electrode tied to the capacitor 192, to terminal A, and to a resistor 193 which is in turn connected to the resistor 187, to terminal Q, and to the heaters of transistors 149 and 151. In addition to connecting to the collector electrode of transistor 144, the Zener diode 189 forms a junction with terminal D along with resistors 183 and 191, the circuit breaker 182, the relay 166, and the heaters of transistors 149 and 151.

Transistor 146 forms a Darlington pair with transistor 147 and has its emitter electrode coupled to the base electrode of transistor 147. The base electrode of transistor 146 forms a common junction with a resistor 194, a capacitor 196, and the collector electrode of transistor 148. Resistor 194 provides driving current for the base of transistor 146 as a result of its connection to the pre-regulator circuit formed by Zener diode 198 and resistor 197. Resistor 197 is connected to the collector electrode of transistors 146 and 147 as part of the common circuit tied to terminal B. The transistor 147 has an emitter electrode connected to the Zener diode 198 which is in turn connected to the junction of resistors 194 and 197. The emitter electrode of transistor 147 is also tied to the common junction of a resistor 199, a thermistor 201 that is shunted by a resistor 202, resistors 203 and 204, and to terminal M.

Transistor 148 has an emitter electrode connected to the resistor 199 and to a neon lamp 206. The base electrode of the transistor 148 connects to the capacitor 196 and to the wiper arm of a potentiometer 207 that forms a voltage dividing network in series with the thermistor 201 and includes resistors 208 and 209.

Transistor 150 has an emitter electrode connected to a resistor 211 and to terminal L. The collector electrode of transistor 150 connects to terminal G and its base electrode forms a common junction with the resistor 204, a capacitor 212, and the collector electrode of transistor 151.

Transistors 149 and 151 are mounted in oven elements for temperature control. These oven elements are supplied power through terminals D and Q. The base electrode of transistor 149 is coupled to a voltage divider network including resistors 213 and 214. Resistor 214 forms a common junction with a diode 216, a capacitor 217, a resistor 218, and a resistor 219. Resistors 218 and 219 are connected to terminals P and N, respectively. The collector electrode of transistor 149 is tied to the junction of the resistor 203 and a resistor 221. Resistor 221 is in series with the capacitor 212 and connects to the base electrode of transistor 151 and to a resistor 222 coupled to the terminal O. The emitter electrodes of the transistors 149 and 151 form a common junction with resistors 209, 211, and 213, and the neon lamp 206 all of which are connected to terminal B.

Returning to FIG. 7, one section of the amplifier control circuit of FIG. 8 controls operation of the xenon lamp 64 which has a starting electrode in series with capacitors 223 and 224 and connected to terminal V of the transformer 171. A resistor 220 is connected in parallel with the capacitor 223 and a resistor 225 parallels the capacitor 224. The lamp 64 also includes an anode electrode coupled through a choke 226 to terminal S and a cathode electrode coupled through a choke 227 to terminal B. A series arrangement of capacitors 228 and 229 is connected to terminal V of the transformer 171 and the choke 227. A capacitor 231 is connected between the chokes 226 and 227.

The galvanometer lamp starting circuit also includes a diode 232 connected to the choke 226, to the collector electrodes of transistors 233, 234, and 236, and to terminal R. Transistors 233 and 234 have a common base junction to the emitter elecetrode of the transistor 236. Transistor 236 connects to terminal A; the emitter electrode of transistor 236 is interconnected to the emitter electrodes of the transistors 233 and 234 through respective resistors 237, 238, and 239 to the positive terminal of the rectifier 138 which also connects to terminal Q.

A capacitor 241 shunts the timing lamp 58 and is connected to terminals T and U of the amplifier control circuit.

A control circuit for the servomotor tachometer 26 includes transistors 242 and 243 having a common collector electrode connection directly to terminal G and the junction of capacitor 142, resistor 244, and diode 116. Transistors 242 and 243 have emitter electrodes connected to terminal O through a capacitor 246 and through respective emitter circuits including diodes 247 and 248, and resistors 249 and 251. The base electrode of transistor 242 is tied to its emitter electrode through a resistor 252, to the base electrode of transistor 243, to a remote control station 253, and to the push button switch 112. The base electrode of transistor 243 is tied to its emitter electrode through a resistor 254. The servomotor tachometer 26 is coupled to the motor control circuit at the junction of the capacitor 246 and the diodes 247 and 248.

Speed selection of the servomotor tachometer 26 is provided for by means of a speed selection network that includes a potentiometer 256, a resistor 257, and a potentiometer 258 all interconnected to terminal B, choke 227, the remote control unit 253, and the servomotor tachometer 26. In a series arrangement with the potentiometer 256 are resistors 259, 261, 262, and 263. Similarly, the potentiometer 258 is in series with resistors 264, 266, 267, and 268. The resistor 257 is in series with a potentiometer 269 and resistors 271, 272, 273, and 274. Resistors 263, 268 and 274 form a common connection to the push button switch 112. Paper drive speed is selected by pushing one of the four basic speed push button switches 104, 105, 106, or 107 and one of the multiplier push button switches 108, 109, or 110. Push button switch 104 controls the slowest paper drive speed and has its first normally open contact tied to the wiper arm of potentiometer 269, its second normally open contact connected to the wiper of potentiometer 258, and its third normally open contact coupled to the wiper of potentiometer 256. The second basic paper drive speed is controlled by the push button switch 105 which has its first normally open contact connected to the junction of resistors 271 and 272, its second normally open contact tied to the junction of resistors 264 and 266, and its third normally open contact connected to the junction of resistors 259 and 261. Push button switch 106 controls the third basic paper drive speed and has its first normally open contact coupled to the junction of resistors 272 and 273, its second normally open contact connected to the junction of resistors 266 and 267, and its third normally open contact tied to the resistors 261 and 262. Push button switch 107 controls the fourth basic paper drive speed and has its first normally open contact connected to the junction of resistors 273 and 274, its second normally open contact connected to the junction of resistors 267 and 268, and its third normally open contact connected to the junction of resistors 262 and 263.

The first center pole terminal of the basic speed push button switches 104, 105, 106, and 107 form a common junction with the first normally open contact of the first multiplier push button switch 108. The second center pole terminal of the basic speed push button switches is interconnected to the second multiplier push button switch 109, and the third center pole terminal of the basic speed push button switches is interconnected to the first normally open contact of the third multiplier push button switch 110.

The first center pole terminal of the three multiplier push button switches 108, 109, and 110 is interconnected in series to a remote control push button switch 276. The fourth center pole terminal of the multiplier push button switches is interconnected to the second terminal of a timing light selection switch 277. The fourth normally open contact of each of the three multiplier push button switches is individually tied to terminals 3, 4, and 5 of the switch 277 and to the remote control unit 253.

The wiper arm of the timing lamp switch 277 is coupled to the third center pole terminal of the recording push button switch 112. The second, third, and fourth normally open contacts of the recording push button switch 112 are connected to the third, first, and second normally closed contacts of switch 276.

The first, second, and third center pole terminal connections of the push button switch 276 are respectively tied to the terminals K, L, and M. Terminals 3, 4, and 5 of the lamp selection switch 277 are respectively coupled to the terminals H, I, and J.

In operation, with the remote control push button switch 276 in the position shown, the oscillograph is set for internal recording control and the remote control unit 253 is disconnected from the system. The timing light switch 277, which controls the flashing intervals of the lamp 58, is set at either its "off" position or in one of four time selection positions. In the "off" position, the switch 277 disconnects the firing circuitry for the lamp 58 and timing lines are not recorded on the light sensitive paper. In the position shown, the lamp 58 is flashed at intervals automatically controlled by selection of the desired paper drive speed. For positions 3, 4 and 5 of the switch 277, full paper width timing lines would be recorded at 0.01, 0.1 and 1.0 second intervals. Timing lines are produced by the light from the xenon lamp 58 by reflection from the mirror 59. From this point, the light follows a path through the condensing lens 52, to the mirror 62, which reflects light through the lens 63, and onto the recording paper.

The timing line xenon lamp 58 is operated by applying a high voltage pulse from the transformer 171 along the length of the lamp. The intense electrical field produced inside the lamp by this pulse ionizes xenon gas, forming a conductive path between the electrodes in the lamp. Conduction between the electrodes of the lamp 58 discharges the capacitor 241 very rapidly thereby producing an intense flash of light. When the capacitor 241 has almost completely discharged, the voltage across the electrodes is insufficient to maintain conduction and the lamp is extinguished. Capacitor 241 recharges during the nonconduction period of lamp 58 and is ready for another firing pulse.

The high voltage pulses which initiate the light flashes from the lamp 58 are produced by transistor 143 which is a constant current source whose current output is selected by resistors 152, 153, or 154. These resistors are individually switched in and out of the transistor circuit (manually or automatically, depending on the mode of operation selected by switch 277) to control the charging time of the capacitor 156. When capacitor 156 is sufficiently charged, the neon lamps 158 and 159 break down, thereby triggering the silicon controlled rectifier 161 and allowing the capacitor 156 to rapidly discharge through the silicon control rectifier 161 and the primary winding of the transformer 171, thereby producing a high voltage pulse across the secondary winding. This high voltage pulse is applied through terminal V to the flash lamp 58.

Next, the desired paper speed is selected by activating one of the four basic speed push button switches 104, 105, 106, or 107 and one of the multiplier push button switches 108, 109, or 110. The speed at which the recording paper moves is controlled by the servomotor tachometer 26 and its electronic circuitry. Essentially, the servomotor tachometer 26 is a servomechanism whose input is a voltage and the output a motor speed proportional to the input voltage which is selected from the speed selection network. By activating one basic speed push button switch and one multiplier push button switch, one of twelve voltage levels is selected from the speed selection network. This voltage is subtracted from the output of the tachometer 26 which is proportional to the speed of the motor. The difference between the selected voltage and the generated voltage constitutes an error signal which is the base drive voltage to the transistor 149. This difference signal is amplified by a circuit consisting of transistors 149, 150, and 151, and after amplification is connected to the base electrodes of transistors 242 and 243 of the motor control circuit. The amplified signal controlled by the transistors 242 and 243 is applied to the servomotor and the motor adjusts its speed to reduce the error signal. Since the amplifier is a high gain amplifier, the error signal can be very small and still provide adequate power to drive the motor. The motor speed is continually adjusted to maintain the tachometer output substantially equal to the selected voltage. The output of the servomotor tachometer 26 is applied to the metering roller 24 through the belt 27.

After the flashing interval for the lamp 58 has been selected by switch 277 and the paper drive speed selected by one of the four basic speed push buttons and one of the three multiplier push buttons, the recording push button switch 112 is activated and the system is operational. Input signals connected to the galvanometers 36 and 37 from the modules 29 and 31 are recorded on light sensitive paper being dispensed over the metering roller 24 by means of a high intensity light beam from the lamp 64. The optical system for generating galvanometer traces includes light from the light intensity lamp 64 focused through the condensing lens 47 onto the mirror 49, illuminating the galvanometer element mirrors. The galvanometer element mirrors reflect this intense light through the condensing lens 52 to the mirror 62, and the condensing lens 63 focuses the galvanometer element light beams into intense light spots on the recording paper as it passes over the metering roller 24. Thus, a trace is generated for each galvanometer element. A galvanometer trace spot may be observed through the viewing screen 22 located in the panel 21. The magnitude of the deflections of the trace from the galvanometer elements are dependent upon the sensitivity of the units and the input attenuation or amplification determined by the modules 29 and 31.

Energizing the galvanometer lamp 64 is initiated when power is applied to the transistor 143 which, as explained previously, acts as a source for charging the capacitor 156. As explained, when the capacitor 156 is sufficiently charged, the neon lamps 158 and 159 break down and turn on the silicon controlled rectifier 161 and the capacitor rapidly discharges through the silicon controlled rectifier and the primary winding of the transformer 171. The resultant high voltage pulse across the secondary of the transformer 171 is coupled to the starting electrode of the lamp 64 through the capacitors 223 and 224. This trigger pulse causes initial ionization of the xenon gas in the lamp. Ionizing the gas causes the capacitors 228 and 229 to rapidly discharge thereby producing a high frequency ringing action in conjunction with the chokes 226 and 227. Ionization now takes place between the anode-to-cathode gap of the lamp thereby establishing a conductive path. As ionization takes place between the anode-to-cathode gap, a boost voltage supplied through the resistor 176 causes a current flow through the lamp and the voltage drop is reduced to approximately 20 volts.

With relatively low voltage appearing across the lamp 64, the blocking diode 232 becomes forward biased because the open circuit voltage of the lamp sustaining supply is positive with respect to the lamp voltage drop. With the relay 166 de-energized and shorting the resistor 181, conduction through the diode 232 causes a high current flow through the lamp 64. This high current causes a hot spot to form on the lamp cathode and thermionic emission now replaces field emission as the mechanism by which electrons are emitted from the cathode. The lamp 64 is illuminated and operating at slightly over its rated power.

This high lamp current is fed through the circuit breaker 182, and as the lamp current increases toward its maximum, the one-ampere rated circuit breaker opens, thereby providing a slight delay which makes lamp starting more reliable. When the circuit breaker 182 opens, current flows through the resistor 139 causing a voltage drop to be generated which energizes the relay 166. This removes the short circuit from the resistor 181 and the transistors 144 and 145 produce a base drive signal to the parametric regulator transistors 233, 234, and 236.

The parametric regulator output is a straight line as shown by curve A in FIG. 9 wherein the regulator output voltage (V) is plotted on the vertical axis and the regulator output current in amperes (I) is plotted on the horizontal axis. Within the capability of the power supply, the regulator output is given by the equation:

$$K_1V = K_2I + K_3 \quad (1)$$

where $K_1$, $K_2$, and $K_3$ are constants which are determined by the ohmic values of the resistors 141, 181, 184, 186, 188, and 191 in addition to the control voltage of the Zener diode 189. The magnitude of the constants $K_1$, $K_2$, and $K_3$ are selected such that the sloping straight line output of the regulator is tangent to the constant power curve B of the lamp 64 at a nominal current value for the lamp. This curve is defined by the equation $VI = K_5$ where $K_5$ is the power rating of the lamp 64.

As the lamp 64 ages, the voltage drop (V) across the lamp increases due to electrode erosion and increased envelope gas pressure caused by blackening of the lamp envelope. However, the regulator output does not follow the constant power curve B for the lamp 64 but instead follows the sloping straight line curve A thereby gradually reducing power dissipation in the lamp. This results in lowering the envelope gas pressure which helps prevent catastrophic failure, such as the lamp exploding.

Energizing the relay 166 also disconnects the circuit breaker 182 from the circuit. The circuit breaker 182 now resets without de-energizing the relay 166. The lamp 64 is now operating at its normal condition and relay 166 will remain energized. Should the source of power be interrupted or the lamp extinguished, the relay 166 will drop out thereby reinitiating the lamp starting cycle.

Grid lines are produced on the paper as it passes over the metering roller 24 by the high intensity light emitted from the lamp 64. The light from the lamp 64 is reflected from the curved condensing mirror 53 to the mirror 56 through the lens 52 which in turn focuses the light onto the recording paper. The grid line mask 66, located between the lens 52 and the paper, allows only the desired pattern of light to expose the recording paper. The grid lines provide a means for quickly determining the amplitudes of the recorded signals.

The oscillograph of this invention as previously described provides a simple means for adjusting the position of the recroded trace. In addition, the speed of the recording paper can be controlled to any one of twelve selected speeds by means of four basic speed push buttons and three multiplier push buttons that serve to control the operation of a servomotor tachometer. Timing lines on the recording paper can be set at fixed intervals or automatically adjusted with the speed of the paper drive mechanism. Linear recording of the input signal is provided by means of a galvanometer displaced from the recording medium and an optical system.

While only one embodiment of the invention, together with modifications thereof, has been described in detail herein and shown in the accompanying drawings, it will be evident that various further modifications are possible in the arrangement and construction of its components without departing from the scope of the invention.

What is claimed is:

1. Recording apparatus comprising:

a housing having a front panel with an opening therein, a light beam galvanometer responsive to an input signal connected to said recording apparatus and mounted toward the rear portion of said housing opposite from the front panel, means for generating a beam of light to said galvanometer to be deflected thereby in response to the input signal, means for recording the deflection of the light beam by said galvanometer positioned at the front of said housing, means for transmitting the light beam from said galvanometer to said recording means to record deflections of the light beam on said recording means, a galvanometer support frame attached to said housing and having an aperture at one end thereof, an adjusting frame to which said galvanometer is mounted in contact with one surface of said support frame, a pivot disk positioned in the aperture of said support frame in contact with said adjusting frame, and an extension arm fastened to said adjusting frame and pivot disk in contact with the surface of said support frame opposite the adjusting frame extending through the front panel of said housing for rotating said galvanometer about an axis formed by said pivot disk in the aperture of said support frame to position the light beam on said recording means in a desired area.

2. Recording apparatus as set forth in claim 1 wherein said light transmitting means includes a mirror for reflecting said light beam to impinge on said recording means at right angles thereto, a first condensing lens displaced between said mirror and said galvanometer to focus the light beam on said mirror, and a second condensing lens positioned between said mirror and said recording means to further focus the light beam.

3. Recording apparatus as set forth in claim 2 including a plurality of light beam galvanometers each responsive to an individual input signal for deflecting a light beam to said recording means in accordance with the variation of the input signal connected thereto.

4. Apparatus for recording the deflection of a light beam on a light sensitive paper comprising:

a housing having a front panel with an opening therein, a light beam galvanometer mounted toward the rear portion of said housing opposite from the front panel, means for generating a beam of high intensity light to said galvanometer to be deflected thereby in response to an input signal, means for transmitting the light beam from said galvanometer to said light sensitive paper to record deflections of the light beam, and means for controlling the speed at which said paper is dispensed through the opening in said front panel including (a) a metering roller engaging said recording means for dispensing said paper through the front panel opening, (b) a servomotor coupled to said metering roller for imparting a rotating motion thereto, (c) a tachometer coupled to said servomotor generating a signal proportional to the speed of said servomotor, and (d) circuit means for comparing the tachometer generated signal with a preselected voltage signal and generating an energizing voltage connected to said servomotor.

5. Recording apparatus as set forth in claim 4 wherein said means for controlling includes a speed selection resistor network for producing twelve independent voltage signals each corresponding to a preselected speed of said servomotor for comparison with the tachometer generated signal.

6. Recording apparatus comprising:

a housing having a front panel with an opening therein, a light beam galvanometer responsive to an input signal connected to said recording apparatus and mounted toward the rear portion of said housing opposite from said front panel, light means for generating a beam of light to said galvanometer to be deflected thereby in response to said input signal, parametric regulating amplifier means for regulating the operating power requirements of said light means at a substantially constant value over its normal operating range and gradually reducing the operating power as the characteristics of said light means change with usage.

means for recording the deflection of the light beam positioned at the front of said housing to be dispensed through the opening therein, and means for transmitting the light beam from said galvanometer to said recording means to record linear deflections of said light beam.

7. Recording apparatus as set forth in claim 6 including a metering roller for controlling the rate at which said recording means is dispensed from said housing, means coupled to said metering roller for controlling the speed thereof, a hopper having opposed side plates and means for supporting recording means designed to be dispensed in a fan-fold manner, the front edge of each side plate having a V-shaped configuration, and a roller having circumferentially grooved shafts extending from each end thereof, said grooves each containing an O-ring to engage the leading edge of said side plates to provide a cushion-type mounting for said roller.

8. Recording apparatus as set forth in claim 6 wherein said parametric regulating means includes a first transistor amplifier coupled to a second transistor amplifier the output of which is connected to said light means.

9. Recording apparatus as set forth in claim 6 including means for generating high intensity light pulses for recording along with said input signal deflections a series of margin timing intervals on said recording means.

10. Recording apparatus as set forth in claim 9 including means for selecting the speed of said metering roller and the timing interval of said high intensity light pulses.

11. Recording apparatus as set forth in claim 9 including electronic circuit means for energizing the timing interval light means and providing a starting pulse of electrical energy to said galvanometer light means.

12. Recording apparatus as set forth in claim 6 including:

a galvanometer support frame attached to said housing and having an aperture at one end thereof, an adjusting frame to which said galvanometer is mounted in contact with one surface of said support frame, a pivot disk positioned in the aperture of said support frame in contact with said adjusting frame, and an extension arm fastened to said adjusting frame and pivot disk in contact with the surface of said support frame opposite the adjusting frame extending through the front panel of said housing for rotating said galvanometer about an axis formed by said pivot disk in the aperture of said support frame to position the light beam on said recording means in a desired area.

13. Apparatus for recording the deflection of a light beam on a light sensitive paper comprising:

a housing having a front panel with an opening therein, a light beam galvanometer mounted toward the rear portion of said housing opposite from the front panel, means for generating a beam of high intensity light to said galvanometer to be deflected thereby in response to an input signal, means for transmitting the light beam from said galvanometer to said light sensitive paper to record deflections of the light beam, a metering roller engaging said recording means for controlling the dispensing thereof through the opening in said front panel, a servomotor-tachometer coupled to drive said metering roller and generating a signal proportional to the speed thereof for comparison with preselected voltage signal for regulating the speed of said servomotor, a hopper having side plates, each side plate having a V-shaped leading edge opening toward the front panel, a roller having circumferentially grooved shafts extending from opposite ends thereof, said grooves each having an O-ring assembled therein to engage leading edge of said side plates to provide a cushion type mounting for said roller to prevent chattering of the paper roll as it is dispensed over the metering roller.

References Cited

UNITED STATES PATENTS

| | | | |
|---|---|---|---|
| 2,580,427 | 1/1952 | Heiland | 346—108 |
| 2,924,499 | 2/1960 | Young et al. | 346—145 |
| 3,080,561 | 3/1963 | Bowditch et al. | 346—136 X |
| 3,143,388 | 8/1964 | Mahoney et al. | 346—109 |
| 3,186,000 | 5/1965 | Sihvonen et al. | 346—109 |

JOSEPH W. HARTARY, Primary Examiner

U.S. Cl. X.R.

226—42; 346—136